US008100099B2

(12) United States Patent
Budack et al.

(10) Patent No.: US 8,100,099 B2
(45) Date of Patent: Jan. 24, 2012

(54) METHOD FOR OPERATING AN INTERNAL COMBUSTION ENGINE, AND INTERNAL COMBUSTION ENGINE FOR CARRYING OUT SAID METHOD

(75) Inventors: Ralf Budack, Ingolstadt (DE); Michael Kuhn, Gaimersheim (DE); Markus Sonner, Kosching (DE); Stefan Dengler, Ingolstadt (DE)

(73) Assignee: Audi, AG, Ingolstadt (DE)

( * ) Notice: Subject to any disclaimer, the term of this patent is extended or adjusted under 35 U.S.C. 154(b) by 201 days.

(21) Appl. No.: 11/596,255

(22) PCT Filed: May 11, 2005

(86) PCT No.: PCT/EP2005/005065
§ 371 (c)(1),
(2), (4) Date: Nov. 13, 2006

(87) PCT Pub. No.: WO2005/111400
PCT Pub. Date: Nov. 24, 2005

(65) Prior Publication Data
US 2007/0256653 A1 Nov. 8, 2007

(30) Foreign Application Priority Data
May 13, 2004 (DE) .......................... 10 2004 023 590

(51) Int. Cl.
*F01L 1/34* (2006.01)
(52) U.S. Cl. ................ 123/90.15; 123/90.16; 123/90.17
(58) Field of Classification Search ............... 123/90.15, 123/90.16, 90.17, 90.31
See application file for complete search history.

(56) References Cited

U.S. PATENT DOCUMENTS

| 4,651,684 A | 3/1987 | Masuda et al. |
| 4,964,375 A | 10/1990 | Takeyama et al. |
| 5,005,540 A * | 4/1991 | Watanabe ................ 123/90.12 |
| 5,443,050 A | 8/1995 | Hitomi et al. |
| 5,529,031 A | 6/1996 | Yoshioka |
| 6,276,138 B1 * | 8/2001 | Welch ............................ 60/602 |
| 6,595,183 B1 | 7/2003 | Olofsson |
| 2004/0089278 A1 | 5/2004 | Ekenberg |
| 2004/0129238 A1 * | 7/2004 | Nishida ...................... 123/90.11 |

FOREIGN PATENT DOCUMENTS

| CH | 667 310 A5 | 9/1988 |
| DE | 38 75 593 T2 | 3/1993 |
| DE | 4312085 A1 | 10/1993 |

(Continued)

OTHER PUBLICATIONS

Balzer et al, "Handbuch der Kfz-Technik Band 1, Motor und Kraftübertragung", pp. 60-65.

(Continued)

*Primary Examiner* — Zelalem Eshete
(74) *Attorney, Agent, or Firm* — Novak Druce + Quigg LLP

(57) ABSTRACT

The invention relates to a method for operating an internal combustion engine comprising at least two cylinders respectively provided with admission valves and exhaust valves. According to the invention, in order to fill the cylinders with a larger amount of unburned gas during a gas exchange, the exhaust interval is reduced and the crossover phase of admission and exhaust intervals is extended, for at least one cylinder (3). The invention also relates to an internal combustion engine for carrying out said method.

5 Claims, 4 Drawing Sheets

FOREIGN PATENT DOCUMENTS

| | | |
|---|---|---|
| DE | 19681579 T0 | 10/1998 |
| DE | 19814888 A1 | 11/1998 |
| DE | 19939619 A1 | 2/2000 |
| DE | 19927950 A1 | 3/2000 |
| DE | 10127928 A1 | 12/2001 |
| DE | 10128622 A1 | 1/2002 |
| DE | 10142260 A1 | 4/2002 |
| DE | 101 06 169 A1 | 8/2002 |
| DE | 102 12 160 A1 | 9/2002 |
| DE | 101 40 120 A1 | 3/2003 |
| DE | 10332825 A1 | 3/2004 |
| DE | 102004006776 A1 | 9/2004 |
| DE | 10 2004 020 458 A1 | 11/2005 |
| EP | 0 319 956 | 6/1989 |
| EP | 0319956 A1 | 6/1989 |
| EP | 1162350 A2 | 12/2001 |
| EP | 1 243 779 A2 | 9/2002 |
| FR | 2 781 011 | 1/2003 |
| JP | 63195325 A2 | 8/1988 |
| JP | 6319525 A | 8/1998 |
| JP | 11324746 A | 11/1999 |
| JP | 2002276418 A | 9/2002 |

OTHER PUBLICATIONS

Bosch, Kraftfahrtechnisches Taschenbuch 25. Auglage, Herausgerber, ISBN 3-528-23876-3, pp. 468-475.

Colloquim., Automobile and Engine Technology, Sciencetif Management, Oct. 7, 2003, pp. 217-237.

Office Action issued Jan. 29, 2008 in a related European application No. EP 05 748 464.4.

Office Action issued Sep. 10, 2009 in a related Japanese application No. JP 2007-512071.

Office Action issued Jul. 4, 2008 in a related Chinese application No. CN 200580010943.1.

* cited by examiner

METHOD FOR OPERATING AN INTERNAL COMBUSTION ENGINE, AND INTERNAL COMBUSTION ENGINE FOR CARRYING OUT SAID METHOD

This application is a U.S. National Stage of PCT/EP2005/005065, having been filed May 11, 2005, which claims priority from DE 10 2004 023 590.2, having been filed on May 13, 2004.

The invention relates to a method for operating an internal combustion engine, and an internal combustion engine for carrying out said method according to the preambles of the independent claims.

The objective of high torque in a 4-stroke engine even at low and extremely low rpm is opposed by at least partially poor filling of the combustion chamber with fresh gas. Especially in engines with exhaust gas charging (turbo engines) in addition the turbocharger cannot be optimally designed for the low mass throughputs of the exhaust gas flow in the lower rpm range. The filling of the combustion chamber before the start of compression is composed, as is recognized, of a portion of the unburned mixture of air and fuel and a portion of burned mixtures. The proportion of the burned mixture depending on the engine boundary conditions can be on the order of up to 10% of the total charging mass of the combustion chamber. Due to the much higher temperature of the residual gas originating from the preceding working cycle, the volumetric proportion of the burned mixture can still be much greater than 10%. The residual gas mass is composed of the following components:

- the residual gas located in the cylinder, which is not flushed out by the intake and exhaust valve during the crossover phase;
- the residual gas which is transported out of the cylinder into the intake region of the engine after opening the intake valves based on a negative scavenging gradient between the cylinder and the intake region and which travels again into the cylinder in the intake phase,
- residual gas which is pushed back again into the cylinder out of the outlet region of the engine before closing of the exhaust valves.

It is recognized that the choice of the closing instant of an intake valve more dramatically influences the filling characteristic and thus the torque characteristic of an engine than the other control times. An early closing instant has been recognized as favorable for high torque in the low rpm range, its having to be considered that by early shifting of the inlet stroke also for crossover between the intake and exhaust valves increases [sic]; this can lead to an increase of the residual gas content and a reduction of the fresh charging amount.

Furthermore it is recognized that for a large valve crossover some of the charge input per cycle can flow through the cylinder without participating in combustion. These so-called scavenging losses adversely affect the efficiency of the engine. But it has also been recognized that in addition to these disadvantages, advantages can also occur since at full load the residual gas is largely eliminated; this results in greater cylinder filling and higher performance. At partial load the residual gas content rises as the valve crossover increases, by which charge cycle work and nitrogen oxide emissions can be reduced.

The object of this invention is to devise a method for operating an internal combustion engine with which higher torques can be achieved at comparatively low rpm. Another object of the invention is to devise an internal combustion engine for executing the method.

The objects are achieved as claimed in the invention each with the features of the independent claims.

As claimed in the invention, in the new method for operating an internal combustion engine which has at least two cylinders which are provided with intake and exhaust valves, to increase the cylinder filling with fresh gas in the low rpm range in a gas exchange for at least one cylinder, the outlet event time is shortened and the crossover phase of the intake and exhaust valves is prolonged by an outlet event time and crossover phase of the inlet and outlet event time being selected in a gas exchange for at least one cylinder, in which the exhaust valve is closed before the pressure on the outlet side exceeds the pressure on the inlet side.

The method as claimed in the invention is based on the finding that on the outlet side of an internal combustion engine at certain times high pressure amplitudes occur which in a conventional gas exchange process lead to negative scavenging gradients. When the exhaust valve of a cylinder opens, the combustion gas flows due to the high pressure gradient with a high mass flow into the outlet region of the engine, i.e., into the exhaust manifold. In this region there are choke points so that the exhaust gas cannot flow out quickly enough. Hence high pressures form in the outlet region of the engine overall and especially in front of the exhaust valves of other cylinders. When the outlet event time is shortened and at the same time the crossover phase of the inlet and outlet event time is prolonged, cylinder filling with fresh gas can be increased, since then a positive scavenging gradient can be achieved to prevent backscavenging, and at the same time active scavenging of the cylinder can occur. In the combination as claimed in the invention of shortening the outlet event time and prolonging the crossover phase of the intake and exhaust valves belonging to the same cylinder, the exhaust valve is closed at the instant prior to the pressure in the outlet side region of the motor reaching its maximum.

In the internal combustion engine as claimed in the invention, there is a control module which shortens the outlet event time to increase cylinder filling with fresh gas during the gas exchange and prolongs the crossover phase of the intake and exhaust valves belonging to the same cylinder.

Developments of the invention can be taken from the dependent claims.

When the outlet event time and the prolongation of the crossover phase take place solely in the low rpm range, preferably less than 2500 1/min, the disadvantages of this method at higher rpm can be avoided based on the increased charge cycle work and deterioration of efficiency. In this instance it is considered that increasing the torque is especially desirable in the low rpm range, since the engine is conventionally optimized to operating points in the medium to high rpm range.

When shortening the outlet event time causes ignition sequence separation of the cylinders, unwanted communication of outlet pressure impulses in different cylinders is stopped. This communication can be adversely superimposed on the gas exchange process.

In another embodiment, the outlet event time is dimensioned such that the exhaust valve closes for a positive scavenging gradient between the inlet and outlet side of the cylinder. With a positive scavenging gradient, good scavenging of the residual gas volume from the preceding combustion cycle is effected. This in turn leads to an increase of the charging portion of the cylinder with fresh gas. Accordingly, the power obtained in the combustion method or the torque increases.

When the internal combustion engine has an exhaust gas turbocharger, there is a more constant pressure on the inlet side of the engine than in a freely intaking engine. Thus, matching the pressure conditions between the inlet and outlet side with respect to an optimized scavenging gradient is facilitated.

The method makes it possible to provide a higher exhaust gas pressure on the outlet side of the cylinder and thus to achieve a higher drive output in an engine with an exhaust gas turbocharger. This in turn leads to increased cylinder filling and accordingly increased output and torque.

In particular, it is provided that the increased pressure occurring after closing the exhaust valve on the outlet side of the cylinder is used to increase the charging pressure produced by the exhaust gas turbocharger on the inlet side.

An outlet event time which is not much longer than the ignition interval of the individual cylinders is preferable and thus, for example in a R4 engine, is approximately 180° KW. In V-engines with nonuniform ignition intervals on one bank of cylinders, cylinder-specific event lengths and crossovers of the outlet control among one another can be necessary, in contrast to the described rule.

Furthermore, it has been found that a crossover phase of the intake and exhaust valves of one cylinder with a length between 5 and 30° KW relative to one valve stroke of 1 mm is favorable. This crossover phase leads to a relatively large time window in which a positive scavenging gradient can be effective.

In the partial load range, due to major valve crossover between the intake and exhaust valves of one cylinder, an increase of the residual gas content arises by internal exhaust gas recovery which for its part leads to dethrottling and thus an improvement of consumption in the lower and medium load ranges. Additional consumption potential depending on the configuration can arise by late adjustment of opening of the exhaust valve inherent in the system and the associated more efficient use of the work of expansion.

By the internal combustion engine being operated with a charging temperature which has been reduced by approximately 50 K by increasing the cylinder filling with fresh gas, the volumetric degree of filling of the cylinder can be increased.

Furthermore, by increasing the proportion of fresh gas the temperature at the end of compression can be lowered and thus the octane requirement of the internal combustion engine is benefited. The reduction of the residual gas content by which both the ignition delay time is lowered and the complete combustion rate is increased has the same effect.

Advantageously the exhaust valves are controlled by means of a camshaft; the exhaust event time is shortened and the crossover phase is prolonged by means of an assigned exhaust camshaft profile.

Advantageous values of the start of opening to prolong the crossover phase at full load and at low rpm contain a start of opening of the intake valves which is earlier by 30±5° KW compared to a conventional method.

Other embodiments, aspects and advantages, regardless of their summary in the claims, can be derived without limiting the generality of the following detailed description using the drawings.

Figure 1:
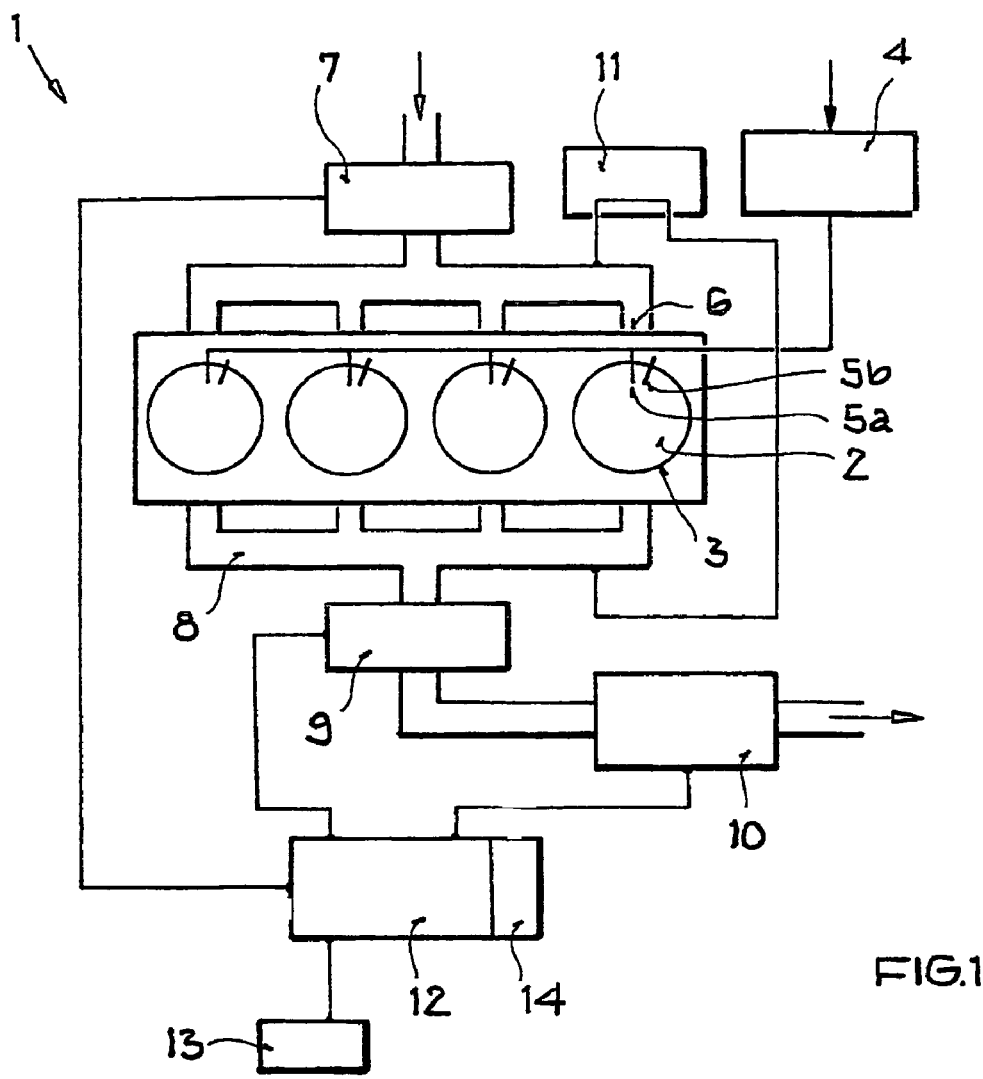
FIG. 1 shows a schematic of an internal combustion engine as claimed in the invention.

FIG. 1 shows a schematic of a turbocharged 4-cylinder internal combustion engine 1 as claimed in the invention. Fuel can be delivered into the combustion chamber 2 of a cylinder 3 by the fuel supply 4; this is indicated by an arrow on the fuel supply 4. Each cylinder has an intake valve 5a and an exhaust valve 5b.

The mixture is supplied by way of a mixture supply means 6. In the inlet region of the internal combustion engine 1 there is an air compressor 7. Supply of air is symbolized by an arrow on the air compressor 7. The exhaust gas device 8 has a exhaust gas turbine 9 which can be operated by the exhaust gas. It goes without saying that the invention can also be fundamentally implemented in an internal combustion engine without exhaust gas charging. Furthermore, there is a catalytic converter means 10 in the exhaust gas device 8. The composition of the combustion mixture can be influenced by the exhaust gas recovery means 11. The various engine functions are control by a pilot control device 12 which receives signals from the sensors 13 for rpm, engine temperature, catalytic converter temperature, throttle valve position and load and output requirements. The control device 12 comprises a control module 14 with which the intake and exhaust valves or the inlet and outlet event times can be controlled.

The method as claimed in the invention makes it possible to distinctly raise cylinder charging, especially a lower rpm. As claimed in the invention, the residual gas content is reduced and the fresh charging mass is raised. The residual gas mass present in the cylinder is composed of the residual gas flushed through the intake and exhaust valve during the valve crossover phase, the residual gas which is transported from the cylinder to the intake side after opening of the intake valves due to the negative scavenging gradient between the cylinder and intake side and which travels into the cylinder again in the intake phase, and the residual gas which is pushed back again into the cylinder shortly before closing of the exhaust valves from the outlet side. The residual gas content is generally less, the greater the pressure difference (scavenging gradient) between the inlet and outlet side of the engine.

Figure 2:
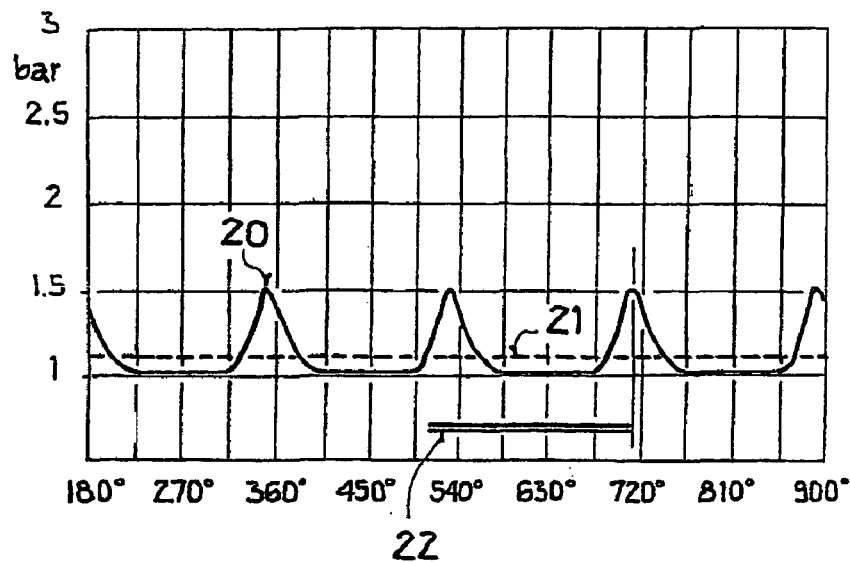
FIG. 2 shows the pressure characteristics of the inlet and outlet region of a conventional turbocharged engine.

FIG. 2 shows a schematic of the pressure characteristics 20, 21 in the inlet and outlet region of a turbocharged internal combustion engine at low rpm (N=1000 min/−1) depending on the crank angle. It becomes clear from the figure that the static pressures alone are not sufficient for describing the relevant phenomena. It is apparent that the inlet-side pressure 21 in front of the intake valve is essentially constant over time. Conversely, on the outlet side the occurrence of high pressure amplitudes which fundamentally influence the respective instantaneous scavenging gradient can be recognized. These pressure amplitudes are the pre-exhaust surges of the cylinders of the engine under consideration. Due to the high pressure gradient the combustion gas flows with a high mass flow into the exhaust region, especially into the exhaust manifold, as soon as the exhaust valve of a cylinder opens. The pressure rises due to the existing choke sites in the exhaust system in front of the exhaust valves of the other cylinders.

Figure 3:
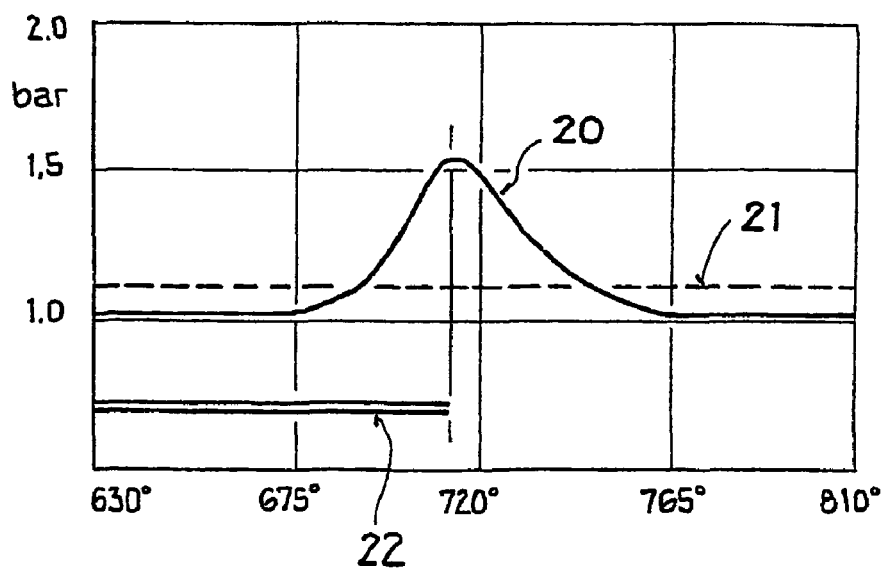
FIG. 3 shows an expanded representation of the range from FIG. 2.

If the outlet event time 22 of the valve is included in the examination, it can be recognized that the exhaust valve closes when the pressure 20 in the outlet side reaches its peak. This is especially apparent in the expanded representation of FIG. 3. At this late instant a relatively large amount of residual gas is flushed back into the cylinder. As claimed in the invention, the scavenging gradient is benefited by shortening the exhaust event length.

Figure 4:
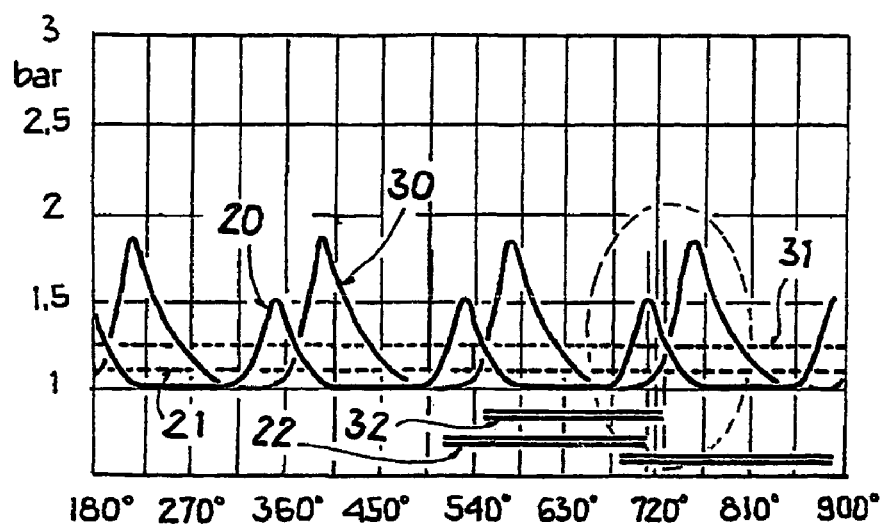
FIG. 4 shows pressure characteristics in the inlet and outlet region of an engine as claimed in the invention compared to a conventional engine.
Figure 5:
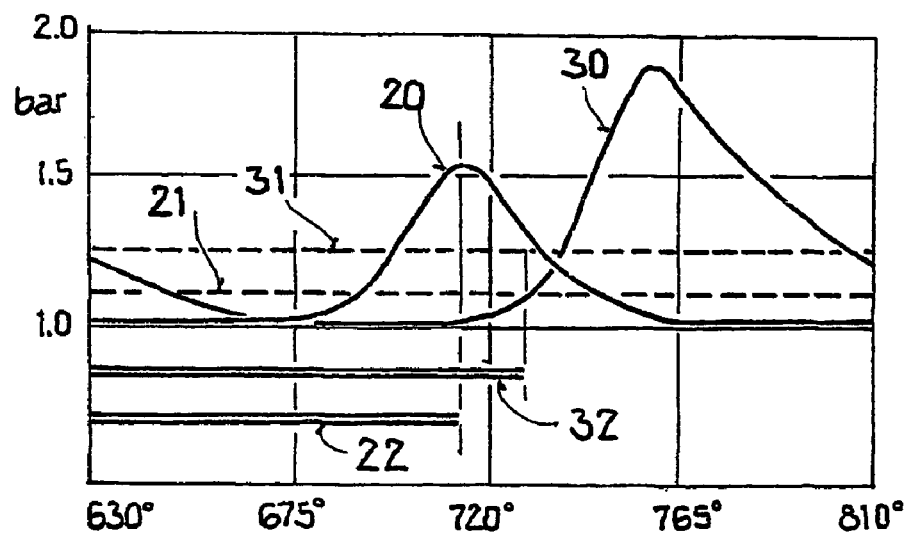
FIG. 5 shows an expanded representation of the region from FIG. 4.

FIG. 4 shows the pressure characteristics 20, 21 in the inlet and outlet region of a conventional turbocharged engine at rpm of n=1000 1/min depending on the crank angle. The expanded representation in FIG. 5 shows that the exhaust valve (see outlet control time 22) closes when the pressure on the outlet side has reached its peak. In contrast, as claimed in the invention in the method described here the exhaust valve is closed (see outlet control times 32) before the pressure in the outlet side 30 exceeds the pressure on the inlet side 31. Based on the resulting positive scavenging gradient the residual gas content is reduced and the fresh charging mass is increased. In this way more energy is made available to the exhaust gas turbocharger which in turn leads to an increase of the charging pressure 31 relative to the pressure level 21.

As claimed in the invention, the exhaust event length is reduced to such an extent that decoupling of the communication of the cylinders via the outlet side is accomplished. This ignition sequence separation is achieved in a R4 engine preferably at an event length of 180° KW.

In order to enable scavenging of the residual gas out of the cylinder, furthermore a relatively long crossover interval of the intake and exhaust valves is shown. Preferably the crossover is between 10° and 25°, relative to a 1 mm valve stroke.

To accomplish the shortened event length and the prolonged crossover phase, additional variability in the control of the exhaust valves should be introduced.

Figure 6:
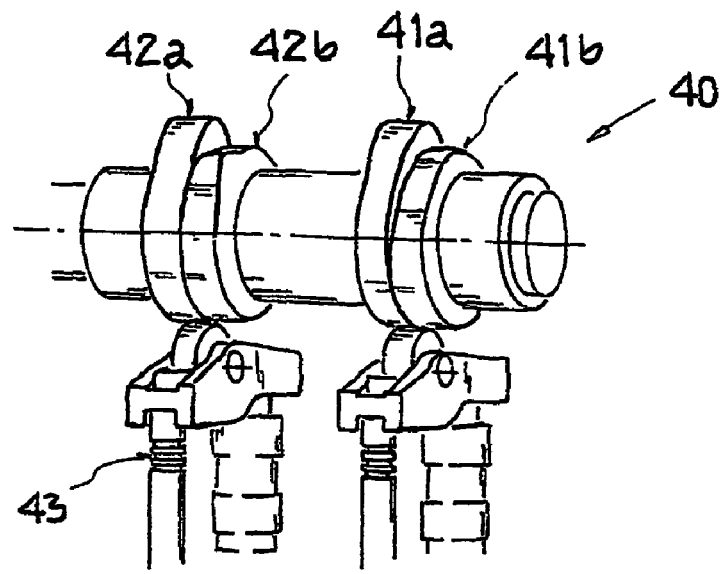
FIG. 6 shows a camshaft with a profile as claimed in the invention for carrying out the method as claimed in the invention.

The internal combustion engine as claimed in the invention, as shown in FIG. 6, can have a valve switching system with which the change of control times as claimed in the invention can be implemented. FIG. 6 shows a part of a camshaft 40 and a step outlet cam 41 and 42 as claimed in the invention (cylinder with two exhaust valves). At low rpm there is switching from one cam with a large stroke contour 41a and 42a to a cam with a smaller stroke contour 41b and 42b. The assigned valve is actuated by way of a valve lifter 43 by the respective cam. The cams 41a and 41b and 42a and 42b as claimed in the invention have stroke contours which are interlaced against one another and do not lie within one another. In this way the necessary variation of the outlet event times as claimed in the invention can be achieved without an additional outlet-side phase splitter.

Figure 7:
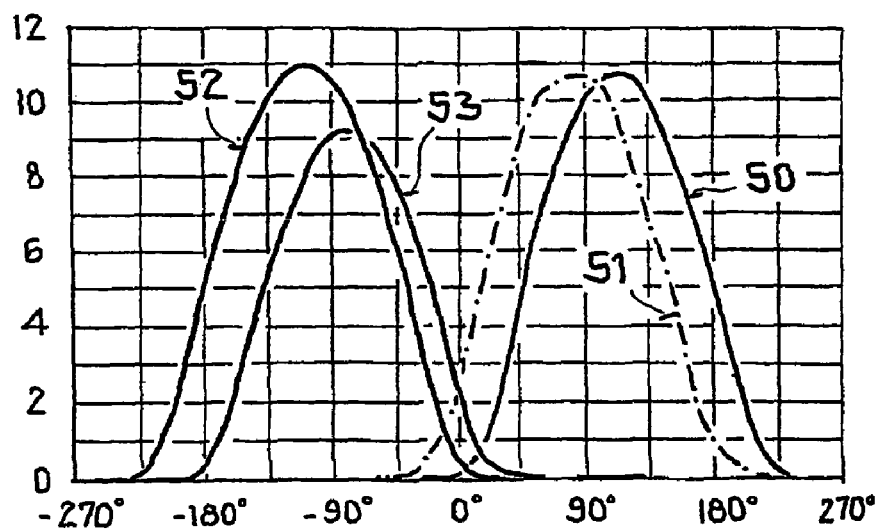
FIG. 7 shows control times of a conventional method and a method as claimed in the invention for operation of an internal combustion engine.

FIG. 7 shows the control times as claimed in the invention compared to conventional control times as a function of the angle of rotation of the crankshaft. Compared to the conventional intake stroke contour 50, the intake stroke contour 51 as claimed in the invention is shifted to early, while the exhaust stroke contour 53 is shifted to late compared to the conventional exhaust stroke contour 52.

The shifting of the intake stroke contour is more advantageously implemented by a camshaft actuator since a late position of the inlet stroke contour-partially has advantages at high rpm.

The valve switching system enables all potentials of shortening of the exhaust event time and the prolongation of the crossover phase of the inlet and outlet event time to be exploited, since the disadvantages in idling and in full load at higher rpm can be avoided.

The invention enables the engine torque to be raised at low rpm by increasing the cylinder charging as a result of reducing the residual amount of gas and shifting the octane requirement. By shortening the outlet event time, backscavenging can be avoided and almost ideal ignition sequence separation of different cylinders can be implemented. The residual gas scavenging of the combustion chamber of the cylinder is improved by the positive scavenging gradient as a result of the increase of valve crossover. Since the exhaust gas energy is increased, for a turbocharged internal combustion engine the charging pressure can be increased to again increase the cylinder filling. At the same time, the ignition conditions can be benefited by reducing the charging temperature and by increasing the complete combustion rate.

REFERENCE NUMBER LIST 1 internal combustion engine
2 cylinder combustion chamber
3 cylinder
4 fuel supply
5a intake valve
5b exhaust valve
6 mixture supply
7 compressor
8 exhaust gas device
9 exhaust gas turbine
10 catalytic converter
11 exhaust gas recovery means
12 engine control device
13 sensors
14 control module
20 pressure outlet side (conventional)
21 pressure inlet side (conventional)
22 outlet event time (conventional)
30 pressure outlet side (as claimed in the invention)
31 pressure inlet side (as claimed in the invention)
32 outlet event time (as claimed in the invention)
40 camshaft
41 outlet cam (as claimed in the invention)
41a outlet cam (as claimed in the invention)
41b outlet cam (as claimed in the invention)
42 outlet cam (as claimed in the invention)
42a outlet cam (as claimed in the invention)
42b outlet cam (as claimed in the invention)
43 valve lifter
50 inlet control time (conventional)
51 inlet control time (as claimed in the invention)
52 outlet control time (conventional)
53 outlet control time (as claimed in the invention)

The invention claimed is:

1. A method of operating an internal combustion engine, wherein the internal combustion engine comprises
  at least one cylinder having an inlet and an outlet,
  an intake valve at the inlet of the cylinder, and
  an exhaust valve at the outlet of the cylinder,
the method comprising:
  opening the exhaust valve during an outlet event time dimensioned to provide a positive scavenging of the cylinder, and wherein the outlet event time is 180° KW+/−10° KW for an R4 engine;
  opening the inlet valve, such that both the exhaust valve and the inlet valve are open during a crossover phase having a length between 5° and 30° KW relative to a 1 mm valve stroke; and
  closing the exhaust valve before an outlet pressure at the outlet of the cylinder exceeds an inlet pressure at the inlet of the cylinder,
wherein the opening of the intake valve and the exhaust valve and the closing of the exhaust valve is effected by a camshaft comprising at least a first cam and a second cam, each having defined cam profiles cooperating with said valves, wherein the first cam and the second cam have stroke contours that are interlaced against one another, wherein the first cam and the second cam do not lie within one another, wherein the second cam has a smaller stroke contour than the first cam, and wherein, when the internal combustion engine is operated in a low rpm range of less than 2500 1/min, the method further comprises:
- shortening the outlet event time; and
- lengthening the crossover phase, wherein both the shortening of the outlet event time and the lengthening of the crossover phase are achieved by switching from the first cam to the second cam.

2. The method according to claim 1, wherein the internal combustion engine comprises a plurality of cylinders, and wherein the method further comprises adjusting an ignition sequence of the cylinders in coordination with the outlet event time.

3. The method according to claim 1 including routing gases on the downstream side of said exhaust valve to an exhaust gas turbocharger of said engine upon closure of said exhaust valve.

4. The method according to claim 1, wherein the duration of the crossover phase varies.

5. The method according to claim 3, wherein the exhaust gas turbo charger produces a charging pressure at the inlet of the cylinder, and the method further comprises allowing the outlet pressure to increase after closing the exhaust valve, and using the increased outlet pressure to increase the charging pressure.

* * * * *